No. 714,528. Patented Nov. 25, 1902.
J. E. SPRAGUE.
MEANS FOR TIGHTENING WIRES IN ELASTIC TIRES.
(Application filed Oct. 11, 1902.)
(No Model.)

Witnesses:
Maude Zwisler.
Walter Bowman.

Inventor:
John E. Sprague,
By C. E. Humphrey,
Atty.

UNITED STATES PATENT OFFICE.

JOHN E. SPRAGUE, OF PORTAGE TOWNSHIP, SUMMIT COUNTY, OHIO.

MEANS FOR TIGHTENING WIRES IN ELASTIC TIRES.

SPECIFICATION forming part of Letters Patent No. 714,528, dated November 25, 1902.

Application filed October 11, 1902. Serial No. 126,835. (No model.)

*To all whom it may concern:*

Be it known that I, JOHN E. SPRAGUE, a citizen of the United States, residing in Portage township, in the county of Summit and State of Ohio, have invented a certain new and useful Improvement in Means for Tightening Wires in Elastic Tires, of which the following is complete specification.

My invention has relation to improvements in devices for placing rubber tires in iron channeled tires, and has especial relation to the means whereby the longitudinal wires used in retaining the rubber in place may be tightened at any time.

The object of my invention is to place within the felly a box-like structure in which shall be placed devices for drawing taut the longitudinal wires used in holding tires in place and to so place these devices that they will be compact and readily accessible for use when desired, and yet not afford an unsightly appearance to the finished wheel.

To the accomplishment of the aforesaid objects my invention consists in the peculiar and novel construction, arrangement, and combination of parts hereinafter described and then specifically pointed out in the claims, reference being had to the accompanying drawings, which form a part hereof.

Figure 1:
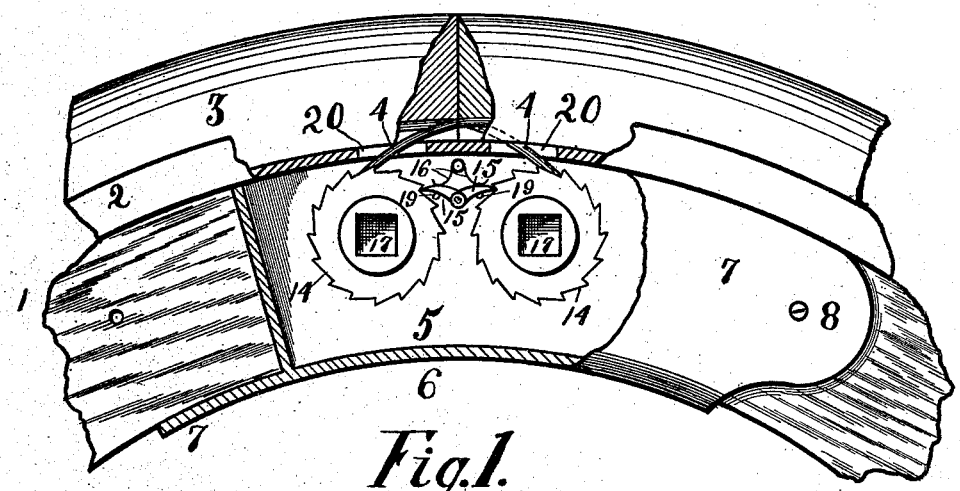
Figure 2:
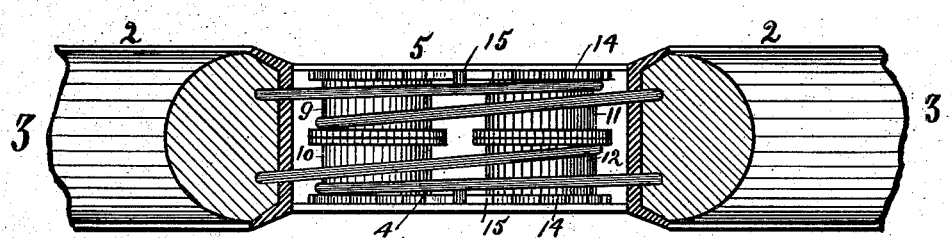
Figure 3:
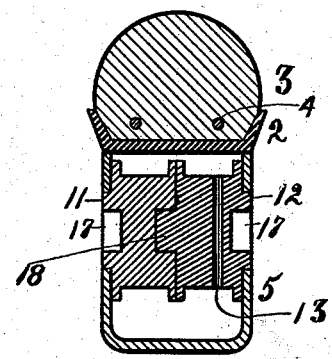

In the accompanying drawings, in which similar reference-numerals indicate like parts in the different figures, Figure 1 is a side elevation, partly in section, of a wheel-felly, iron tire, rubber tire, and my improved fastening devices in place; Fig. 2, a plan of a wheel provided with a rubber tire and in which view both the rubber tire and iron tire are cut away to show the tightening devices placed within the body of the felly, and Fig. 3 is a section through one set of windlasses showing their construction.

In the drawings, 1 is the ordinary wooden felly of a wheel, on the outer circumference of which is placed the channeled-iron tire 2 of ordinary construction. On top of and between the flanges of this iron tire 2 is placed the rubber tire 3, which may be of any of the common forms of tire. Within this tire are two longitudinal wires 4, used for the purpose of holding and retaining the rubber tire firmly in the iron channeled tire. My device for tightening these wires within the body of the rubber tire is as follows: A portion of the felly 1 is cut away, generally at the point where a joint is commonly made in the felly of a wheel, and then is interposed in the space left by this cut a box-like structure 5. This structure is divided into a main compartment 6, with two hollow ends 7 to embrace the loose ends of the felly, and the felly is connected and held within these ends by screws 8 or any suitable or convenient means. This box-like structure 5 is adapted to be of the same depth internally as the depth of the felly and to receive as an upper cover the under surface of the channeled-iron tire and to be coincident in width therewith. Extending between the sides of the main body portion 6 of the box 5 are two sets of winding-drums, each set consisting of two winding-drums in alinement with one another, the set on the left in Fig. 2 consisting of winding-drums 9 10 and the set on the right in the same figure consisting of winding-drums 11 12. These sets are identically alike and a description of one will suffice for both, and they consist of a drum-like body through which passes an opening 13, each winding-drum having upturned ends to retain the wire which is to be wound thereon in place, and each has on its outer edge ratchet-teeth 14, adapted to be engaged by pawls 15, and each pawl is held in place by springs 16. In the central outer surface of each winding-drum is a square hole 17, into which a wrench may be inserted to revolve the winding-drum. In each set of winding-drums one winding-drum has a projecting circular boss 18 projecting into the winding-drum next adjoining it, so as to make the two winding-drums self-supporting and independently capable of revolution. The outer surfaces of each winding-drum are provided with a hub-like portion to project into the side walls of the box 5 and to be thus retained in proper place. An opening 9 is provided (see Fig. 1) in each side of the portion 5, by which a sharp-pointed instrument may be inserted with a view to raise the pawl 15 from engagement with the ratchet-teeth into which it is intended to engage to release that particular winding-drum. The bottom floor of the channeled-iron tire 2 is slotted at the points 20 to permit the wires from the ends of the tire to pass down through into the box-like structure 5'.

The following operation is used in placing a rubber tire in position when my device is employed: The rubber tire bearing the wires projecting therefrom is wrapped around the channeled-iron tire 2, and the ends of the wires are inserted in the winding-drums farthest from the end of the tire from which they project—that is, as shown in Fig. 2, the wires from the right-hand end are carried across into the winding-drums 9 10 and the wires from the left end in Fig. 2 of the tire are inserted in holes in the winding-drums 11 and 12. A wrench having a shank is inserted successively in each of the openings of the winding-drums, and by means of this wrench each is revolved until each wire has acquired a sufficient degree of tension to retain the rubber in place. Should it happen that at any time during the use of this tire it should become loosened from wear, all that is necessary is to insert a wrench in any one of the winding-drums, and a partial rotation thereof will bring the tension of that particular wire to a proper condition. Should it be necessary for any reason to remove the rubber tire from the wheel, a sharp-pointed instrument is inserted in the opening 20, and the pawl attached to that particular ratchet is raised and the ratchet and winding-drum permitted to revolve in a reverse direction, which immediately releases the tension on the wire and permits the ready removal of the tire from the wheel.

What I claim, and desire to secure by Letters Patent, is—

1. A frame to be inserted in the felly of a wheel provided with a rubber tire, winding-drums mounted in said frame to draw by their revolution the wires in said rubber tire to a desired tension.

2. The combination of a frame to be inserted in the felly of a wheel, a rubber tire mounted on said wheel, wires in said rubber tire, winding-drums mounted in said frame, means to connect said wires to said winding-drums and means to revolve said winding-drums, substantially as shown and described.

3. The combination of a wheel, a frame inserted in the felly thereof, an iron tire surrounding said felly, a rubber tire provided with longitudinally-embedded wires in said iron tire, winding-drums mounted transversely in said frame, means to attach the wires in said rubber tire to said winding-drums, and means to retain said winding-drums at any desired point, substantially as shown and described.

4. The combination of a wheel provided with a felly, a frame mounted in said felly, winding-drums mounted transversely in said frame in pairs, each independently revoluble, with a rubber tire surrounding said felly provided with embedded longitudinal wires and means to connect said wires to independent winding-drums and means to revolve said winding-drums independently of each other, substantially as shown and described.

5. The combination with a wheel provided with a felly, a frame situated in said felly, a channeled-iron tire surrounding said felly, a rubber tire bearing independent longitudinal wires, independent winding-drums mounted in said frame and means to connect the ends of said wires with said winding-drums, means to retain said winding-drums in place, and means to release said winding-drums when desired, substantially as shown and described.

6. The combination of a wheel having a felly, a frame mounted in said felly, an iron tire surrounding said felly, a rubber tire situated in said iron tire, wires in said rubber tire, winding-drums in said frame, means to connect said wires with said winding-drums, and means to permit the passage of said wires from said rubber tire to said winding-drums through said iron tire, substantially as shown and described.

7. The combination of a frame situated in the felly of a wheel, winding-drums mounted in said frame and capable of independent revolution, pawls to retain each winding-drum in a desired position independently, holes in the sides of said frame to permit the insertion of a pawl-raising tool, substantially as shown and described.

In testimony that I claim the above I hereunto set my hand in the presence of two subscribing witnesses.

JOHN E. SPRAGUE.

In presence of—
C. E. HUMPHREY,
MAUDE ZWISLER.